United States Patent [19]

Strauff

[11] 4,010,815
[45] Mar. 8, 1977

[54] SERVO STEERING GEAR, PARTICULARLY FOR ALLEVIATOR-CONTROLLED CONSTANT PRESSURE SERVO SYSTEMS IN MOTOR VEHICLES

[75] Inventor: Günther Strauff, Kaarst, Germany

[73] Assignee: Langen & Co., Dusseldorf, Germany

[22] Filed: May 29, 1975

[21] Appl. No.: 581,929

[30] Foreign Application Priority Data

June 1, 1974 Germany .......................... 2426712

[52] U.S. Cl. ................................. 180/132; 91/373
[51] Int. Cl.² ........................................... B62D 5/08
[58] Field of Search .................. 180/79.2 R, 132; 91/372, 373, 374, 377, 380

[56] References Cited
UNITED STATES PATENTS

| | | | |
|---|---|---|---|
| 3,010,436 | 11/1961 | Folkerts | 91/380 |
| 3,885,456 | 5/1975 | Forster | 91/380 |

Primary Examiner—M. H. Wood, Jr.
Assistant Examiner—John A. Pekar
Attorney, Agent, or Firm—Holman & Stern

[57] ABSTRACT

A servo steering gear for motor vehicles has an alleviator controlled, constant pressure servo system including an input member operatively connected to a steering wheel of a vehicle and an output member operatively connected to the steered wheels of the vehicle. A servo motor is operatively connected to the output member, and is controlled by an arrangement including valve elements so disposed that an automatic restoration of the steered wheels can take place and that pressure-loaded reaction faces provided on the valve elements generate a reaction which a driver of the vehicle can feel, and which, at least within a defined range, depends on the reactive forces generated by the steered wheels.

7 Claims, 5 Drawing Figures

SERVO STEERING GEAR, PARTICULARLY FOR ALLEVIATOR-CONTROLLED CONSTANT PRESSURE SERVO SYSTEMS IN MOTOR VEHICLES

BACKGROUND OF THE INVENTION

This invention relates generally to a servo steering gear, and particularly for an alleviator controlled, constant pressure servo system for motor vehicles. More particularly, the invention comprises an input member operatively connected to a steering wheel and an output member operatively connected to the steered wheels, a servo motor operatively connected to the output member, control means for the pressure fluid and having connections for a pressure pipe to a pressure souce particularly in the form of a pump associated with an alleviator, for an exhaust pipe and for at least one working pipe leading to one working chamber of the servo motor, actuating means for the valve elements of the control means for controlling the servo motor, said actuating means responding to relative motion between input and output member not resulting in a direct transmission of force, and said valve elements being shiftable by the actuating means into a position in which a working chamber of the servo motor is connected to the pressure source or to exhaust to assist the motion of the output member initiated by the input member. The valve elements are so disposed that an automatic restoration of the steered wheels can take place and that pressure-loaded reaction faces provided on the valve elements generate a reaction which the vehicle driver can feel, and which at least within a defined range depends upon the reactive forces generated by the steered wheels.

Recently, there has been increasing support for the idea of replacing the hitherto conventional "open center" piston valves in the control means for controlling the servo motor by piston valves of the "closed center" type. The reason is that servo steering gear availing itself of "closed center" piston valves can be supplied by the general hydraulic system of the vehicle, more particularly, alleviators can be incorporated as hydraulic storage devices and safety reservoirs, and smaller capacity pumps can be used. Naturally, it has been the aim to retain the advantages of "open center" valves. The latter comprise automatic restoring action of the steered wheels into the neutral position, a predetermined initial pressure in the working chambers of the servo motor in neutral position, the possibility of providing direct mechanical steering within a limited range about the neutral position for the purpose of providing a response threshold, and finally, the possibility of limiting the steering effort to a maximum value.

Two alternatives in principle have been proposed for solving these problems. In the first alternative a spring-loaded control valve is associated with each working chamber of a servo motor. In the other alternative use is made of the so-called two-edge control system which avails itself of a servo motor having different hydraulic cross sections. The smaller cross section is permanently loaded by the pressure supplied by the source, whereas the pressure fluid supplied to or exhausted from the working chamber having the major hydraulic cross section is controlled by a piston valve having two control edges. Whereas forms of construction comprising two control pistons located in parallel or a single piston valve disposed parallel to a reaction piston have already been successful (German Patent Applications Nos. P 22 42 021.9, P 22 42 022.0), difficulties arise when in a two-edge control system two reaction faces are to be provided on one piston valve or when in a four-edge control system both piston valves are to be coaxially arranged. Since in such cases some degree of displaceability of the control piston or pistons, which is independent of the actuating member, must be provided in order to permit automatic restoration of the steered wheels to neutral position, the actuating member has been coupled to a supplementary piston which in turn acts on the control piston or pistons through interposed springs. Such arrangements are described for instance in copending USSN 391,271, filed Aug. 4, 1973 and USSN 471,699, filed May 20, 1974; and in U.S. Pat. No. 3,927,602. In order to avoid unacceptably great overall lengths of the steering gear it was necessary to make the supplementary piston relatively short. However, in the case of an eccentrically positioned actuating member, such as a steering finger coupled to a steering nut, this introduces the risk of jamming and excessive hystoresis effects. These arrangements were not therefore desirable when short overall length units were required.

OBJECTS AND SUMMARY OF THE INVENTION

It is therefore the object of the present invention to contrive a servo steering gear of the above specified kind in such a way that notwithstanding minimal overall length, sufficiently long guiding faces can be provided, that an initial basic pressure can be maintained in the working chambers of the servo motor, that an automatic restoring action of the steered wheels into their neutral position is possible, that, if desired, response thresholds and limitations of the steering effort can be easily incorporated in such a way that the arrangement is applicable to a piston valve having two control edges and two reaction faces as well as to two coaxially disposed piston valves each having only one reaction face. More particularly, it is also contemplated that actuation should be possible by means of an actuating finger attached to a steering nut. Finally, the entire gear is to consist of simple and inexpensive components. Generally speaking the overall object is to improve servo steering gear of the specified kind and to adapt it to modern demands and conditions.

According to the invention these objects are achieved by an arrangement in which a substantially stationary body contains a first valve element engaged without clearance by the actuating means and displaceable thereby, and providing with grooves and/or bores which in cooperation with slots and/or bores establish permanent fixed flow connections independently of the relative position of the body and the valve element, and a second valve element cooperating with the first valve element and movable in relation thereto and in relation to the body by small displacements, said second valve element likewise containing grooves and/or bores which cooperate with grooves and/or bores in the first valve element in such manner that according to the relative position between the first and the second valve element the working chamber is placed into communication with the pressure source or with exhaust or that these connections are blocked, both valve elements being provided with at least one reaction face which opposes displacement. In order to provide a response threshold it is proposed to keep the first valve element centered in conventional manner in relation to the body up to a predetermined displacing thrust by a single precompressed centering spring which is effective in both directions of displacement. In a preferred form of construction the first valve element is a control sleeve which is slidable in a cylindrical bore in the body and traversed by a central stepped end-to-end bore which slidably contains the second valve element in the form of a control piston containing two control edges which cooperate with corresponding control edges in the control sleeve and comprising different diameter positions corresponding to the steps in the end-to-end bore, and an annular chamber formed between the steps and different diameter portions is connected to the varying pressure of a working chamber, whereas a substantially constant pressure is applied to at least one additional hydraulically effective face on the control sleeve or the control piston. In order to keep the control piston in a well defined center position, opposed-acting springs supported by the valve body may be arranged to bear against the two ends of the control piston. The additional hydraulic face may be created by a second step so that the resultant face opposes the effect of the first hydraulic face, the end face of the control piston being brought back to the same diameter by the provision of a third step separated in fluid-tight manner from the smaller diameter portion created by the second step, and the annular chamber created by the provision of the third step being connected to exhaust. With advantage the additional hydraulic cross section may be subjected to the full pressure of the source and it should bear the same proportion to the first hydraulic cross section as that existing between the associated faces of the servo motor. In order to limit the steering effort to major diameter portion of the control piston may consist of a sleeve slidable in fluid-tight manner on the other portion of the piston and provided in its interior with two abutments for spring retainers supporting the ends of a precompressed spring, the spring retainers in position of rest being level with two identically spaced abutments on the other portion of the control piston, whilst pressures bearing the same constant ratio as the hydraulic cross sections of the two faces of the servo piston and derived by reduction of the pressure supplied by the pressure source in a pressure reducing transformer, are applied to the ends of the control sleeve and of the control piston. However, as an alternative the stepped piston may have only two portions of different diameter, and reduced pressure may be applied thereto in the same way as to the control sleeve, as already described. Conveniently, the pressure transformer may be a proportional pressure valve. Other features and advantages of the invention will be understood from the following particular description.

DETAILED DESCRIPTION OF THE PREFERRED EMBODIMENTS

Figure 1:
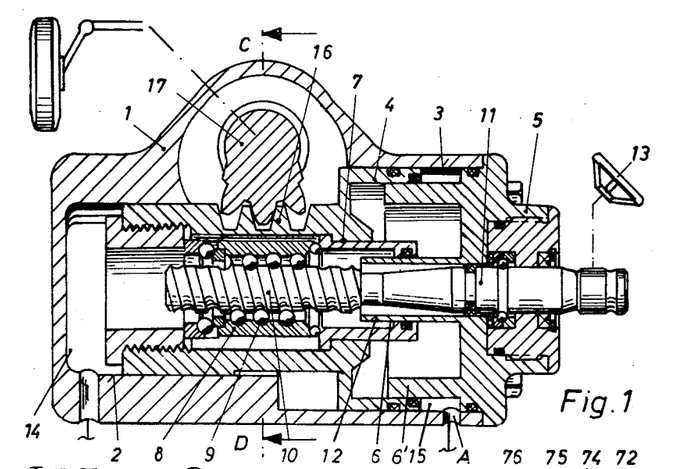
FIG. 1 is a cross-sectional view of a servo steering system comprising a steering worm and a travelling nut, as well as an associated servo motor.

A body 1 contains a stepped cylinder chamber formed by a small diameter portion 2 and an adjoining coaxial larger diameter portion 3. Slidably contained in these two cylinder chambers 2 and 3 is a servo piston 4 which is correspondingly stepped. The end of chamber 3 is closed by a cover 5 which has cylindrical extensions 6 and 6' projecting concentrically into the cylinder chamber 3. The cylindrical extension 6 passes through a seal axially into a bush 7 which provides axial location for a steering nut 8 inside the servo piston. The threads of the nut 8 engage a screw shaft 10 through an interposed circulating ball bearing 9. The screw shaft 10 has a plain portion 11 which passes through a seal in the central bore 12 of extension 6 and through the cover 5 to the outside where it is operatively coupled to a steering shaft and a steering wheel 13. Inside the cylinder chamber 2 one end of the servo piston 4 defines a working chamber 14, whereas at the other end a working chamber 15 annularly embraces the extension 6', the ratio of the hydraulic cross sections of the two working chambers 14 and 15 being 2:1. Outside its circumferential portions which form the fluid-tight sliding surfaces of the servo piston 4 the latter comprises a portion in the form of a rack 16 which meshes with a gear quadrant 18 on an output shaft 17. The steering nut 8 is provided with an actuating finger 19 which projects to one side substantially at right angles to the nut axis. It will be understood by reference to FIG. 2 that not all the parts that should be seen in the section C-D are actually shown. For the sake of simplicity only the steering nut 8 and the actuating finger 19 as well as the valve means that are yet to be described are included. The finger 19 passes through the servo piston 4 and through an opening likewise not shown. The axial measurement of the finger 19 is at least equal to the stroke of the servo piston 4. The free end 20 of the finger 19 engages an axial slot 21 in body 1. The width of the slot 21 slightly exceeds the width of the finger 19, permitting the latter to move a limited distance (viewed in the peripheral direction of the nut). A bore 22 cuts perpendicularly across the slot 21 in a direction across the axis of the nut 8. Some distance away from the slot 21 and bore 22 widens to form a coaxial larger bore 23. Slidable inside the bore 22 is a control sleeve 24 which in positions axially spaced away from the slot 21 contains annular grooves 25 and 26. The annular groove 25 communicates through a duct 27 in body 1 with an exhaust pipe 28, whereas the annular groove 26 communicates through another duct 29 with a pressure pipe 30 leading to a pressure source 31, not shown in the drawing in detail. A pipe 32 branches off the pressure pipe 30 to a connection A leading into the working chamber 15. Spaced axially away from the annular groove 26 the control sleeve 24 forms a shoulder 33 which in position of rest is at the same level as a shoulder 34 dividing the two bores 22 and 23. The shoulders 33 and 34 support a spring retainer 35 for a centering spring 36 of which the other end bears against another spring retainer 37 which in position of rest is supported jointly by a stop face 38 on the control sleeve 24 and a stop face 39 on a cover 40 which closes the bore 23. The control sleeve is internally axially traversed from end-to-end by a bore of repeatedly changing diameter, comprising a portion 41 of major diameter, a portion 42 of minor diameter, a portion 43 of slightly larger diameter and a portion 44 of the same diameter as portion 41. Portion 42 contains two axially widely spaced annular grooves 45 and 46. The several portions 41 to 44 slidably contain portions of corresponding diameters marked 47, 48, 49 and 50 of a control piston. An annular chamber adjoining portion 47 is marked 51, a similar chamber adjoining portion 50 is marked 52 and a chamber adjoining portion 50 is marked 53 in the drawing. In the region between the annular grooves 45 and 46, portion 48 of the control piston contains an annular groove 54 which forms a control edge 55 and 56, respectively, at each end. A transverse bore 57 connects the annular groove 54 to slot 21, whereas the annular groove 45 communicates through a transverse bore 58 with the annular groove 25. Another transverse bore 59 provides a connection between the annular grooves 26 and 46. Moreover, a duct 60 branches off the transverse bore 59 and leads to the annular chamber 52. The annular chamber 53 communicates with the transverse bore 58 through a duct 61 indicated in chain lines. Another duct 62 provides communication between slot 21 and the annular chamber 51. The chambers adjacent the ends of the control sleeve are marked 63 and 64. Pipe connections 65 and 66 connect these chambers 63 and 64 via a pipeline 67 to a connection 68 on a pressure regulating valve 69. In its interior this valve 69 contains two adjoining coaxial bores 70 and 71 of different diameters, the smaller diameter being that of bore 70. A differential pistion comprising two cross sections 72 and 73 is slidable in the bores 70 and 71. A control edge 74 at one end controls the flow of pressure medium between a connection 75 and the above-mentioned connection 68. A pipeline 76 leads from 75 to the pressure pipe 30. A branch pipe 77 of pipe 67 provides a connection to the chamber 78 adjoining the end of the differential piston formed by part 73. The annular chamber 79 surrounding part 72 is connected to an exhaust pipe.

Figure 4:
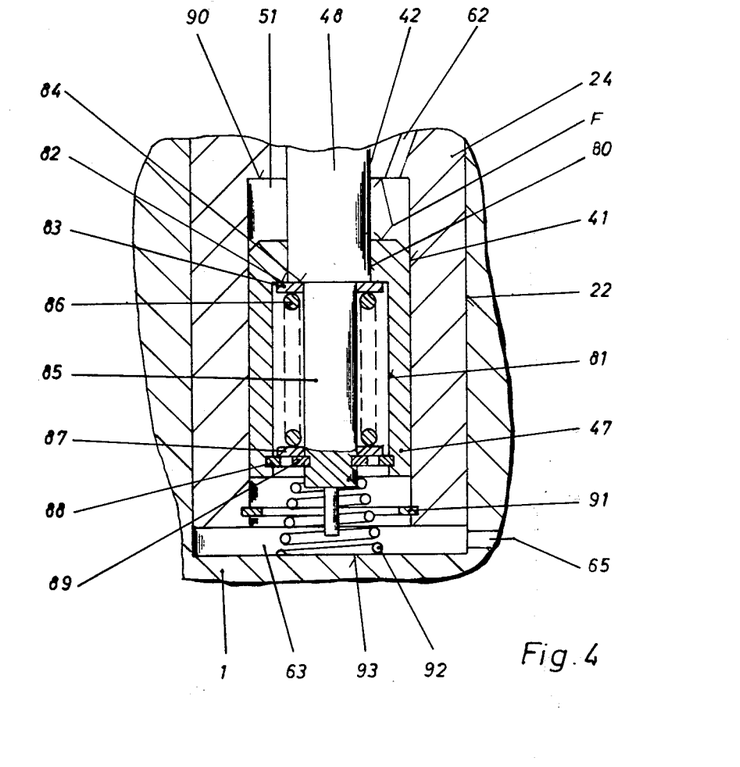
FIG. 4 is a cross-sectional view of the portion of the valve means which serves for limiting the steering effort.

As will be understood more particularly by reference to FIG. 4, the portion 47 of the control piston consists of a sleeve containing an opening 80 equal in diameter to portion 48 of the piston, the latter projecting through this opening into a wider coaxial bore 81. The shoulder 82 formed between opening 80 and bore 81 provides a supporting face for a spring retainer 83 which in position of rest also bears on a shoulder 84 between portion 48 and a shaft-like extension 85. The spring retainer 83 carries one end of a spring 86 of which the other end bears against a spring retainer 87 resting on a ring 88 inside bore 81 and a second ring 89 embracing the shaft-like extension 85. The possible displacement of the sleeve 47 is limited on the one hand by the shoulder 90 between portions 41 and 42 and on the other hand by a stop 91 in the bore 41. A relatively weak compression spring 92 bears against the bottom 93 of chamber 63 and cooperates with the rear face of ring 89.

For an explanation how this arrangement functions let it be assumed that the steering wheel 13 is turned in the counter-clockwise direction. This will result in a counter-clockwise deflection of the finger 19 in FIG. 2. However, the finger 19 will at first remain stationary until the resistance of the centering spring 36 has been overcome, so that in this initial stage the steering action will not yet be servo-assisted. Not until a response threshold determined by the bias of the centering spring 36 has been overcome will the control sleeve 24 be slightly displaced in the upward direction to open communiction between the slot 21 which is, incidentally, connected to working chamber 14, as indicated by a dot-dash line, and the return pipe 28 to exhaust. The pressure in working chamber 14 will therefore drop and allow the servo piston 4 to be shifted to the left in response to the steering movement that has been initiated. At the same time the pressure in chamber 51 which serves as a reaction chamber will also fall. Since the pressures in chambers 63 and 64 and in the annular chamber 52 remain constant a resistance will be felt which corresponds to the pressure drop in the annular chamber 51, which opposes the direction of shift of the control sleeve 24. The control piston meanwhile bears against the cover 40. If conversely the steering wheel were moved in the clockwise direction, causing the finger 19 in FIG. 2 to be likewise displaced in the clockwise direction, communication will be established between the pressure pipe 30 and slot 21 as soon as the resistance due to the bias of the centering spring had been overcome. Hence, the pressure in working chamber 14 would rise and the servo piston 4 would be shifted to the right. At the same time the reaction pressure in annular chamber 51 would rise. The control piston moves against the bottom 93, so that the pressure in the annular chamber 51 opposes the displacement of the control sleeve. The automatic restoration of the steered wheels into their straightahead positions is easily accomplished because owing to the pressure change in the working chamber 14 which accompanies such a return motion and which is transmitted into the annular chamber 51, the control piston will be so displaced in relation to the stationary control sleeve 24 that the necessary connections are established. For example, let it be assumed that the servo piston must be shifted to the left in the course of a restoring movement. The pressure in the annular chamber 51 will then rise and displace portion 47 downwards. This establishes communication between slot 21 and the exhaust pipe 28 permitting pressure fluid to escape from working chamber 14. So far it has been assumed that the bias of spring 86 is sufficient to prevent relative movement between portions 47 and 48. However, when the pressure in the annular chamber 51 reaches an upper limit, the spring retainer 83 will be lifted off its stop face 84, and portion 47 will eventually be forced into contact with stop 91. Further rises in pressure in the annular chamber 51 will not then cause further reactive thrust to be applied to the control sleeve 24 because the portion 47 and the control sleeve 24 may be regarded from this instant onwards as being rigidly jointed. The resistace the driver feels in the steering wheel will therefore not exceed the reaction due to the bias of spring 86 when portion 47 is in contact with stop 91. Conversely, when displacement of the control sleeve 24 upwards results in the pressure in annular chamber 51 falling below a predetermined limit, then portion 47 will be shifted by the constant pressure in chamber 63 until spring retainer 87 loses contact with stop 89 and after a limiting pressure has been reached portion 47 will move into contact with face 90. Notwithstanding any further pressure drop in the annular chamber 51 at least the thrust of spring 86 in this position will continue to bear on the control sleeve 24, as will be readily understood from a consideration of the totality of thrusts which act on the control sleeve 24. The limitation of the steering effort thus provides the same reactive torque in both hands of rotation, naturally always providing the distances traversed by portion 47 into contact with the respective stops are the same in both directions from the position of rest. It should be apparent to a person skilled in the art that if the described limitation of the steering effort were not wanted the illustrated arrangement would still be functionable in the absence of the pressure transformer 69 and the pressurization of chambers 63 and 64, as well as of the movable special portion 47.

Figure 2:
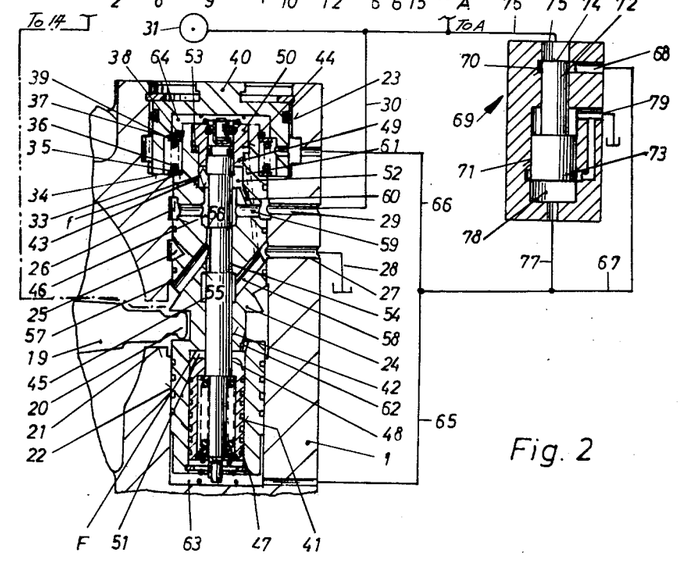
FIG. 2 is a partial section view taken on the line C–D in FIG. 1 and showing the portion containing the valve means, pipe connections outside the section between FIGS. 1 and 2 being symbolically indicated.
Figure 3:
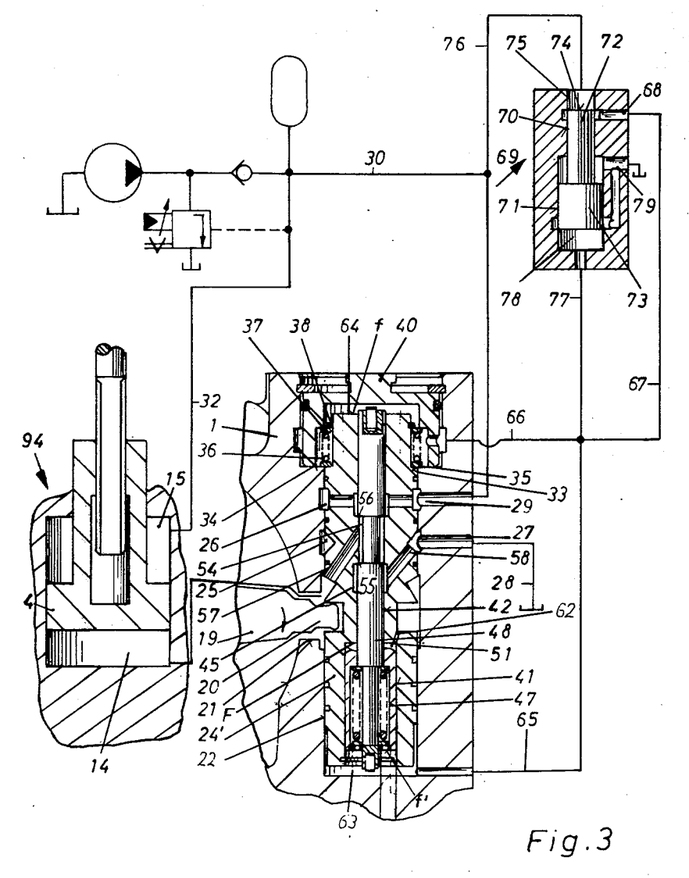
FIG. 3 is a cross-sectional view of an arrangement comprising slightly modified valve means, the servo piston in FIG. 1 and the body of the steering gear being only symbolically indicated.

FIG. 3 illustrates substantially the same arrangement as that shown in FIGS. 1 and 2, excepting that the control piston and the control sleeve are modified. The servo piston in FIG. 1 and the body are therefore only symbolically shown and indicated at 94. The other reference numbers identifing functionally equivalent parts have been retained unchanged. The difference between the control sleeve 24' and sleeve 24 merely consists in that bore 42 continues to chamber 64 without further enlargement. Consequently, portion 48 of the control piston is merely interrupted by the annular groove 54 and otherwise continues without change of diameter to chamber 64. In this arrangement the annular chamber 51 again serves as a reaction chamber. Whereas the arrangement according to FIG. 2 would still have been fucntionable even in the absence of pressure in chambers 63 and 64, this does not apply to the present case. The pressures in chambers 63 and 64 are necessary to balance the thrusts generated in annular chamber 51. However, assuming that limitation of the driving effort is desired, the entire arrangement is simpler than that in FIG. 2 because of the simpler design of the control sleeve 24' and the associated control piston. The manner in which the arrangement functions, to the extent control is concerned, is the same as that described with reference to FIG. 2. The driving effort limitation again limits the reactive forces to the resultant biasing thrust of spring 86.

Figure 5:
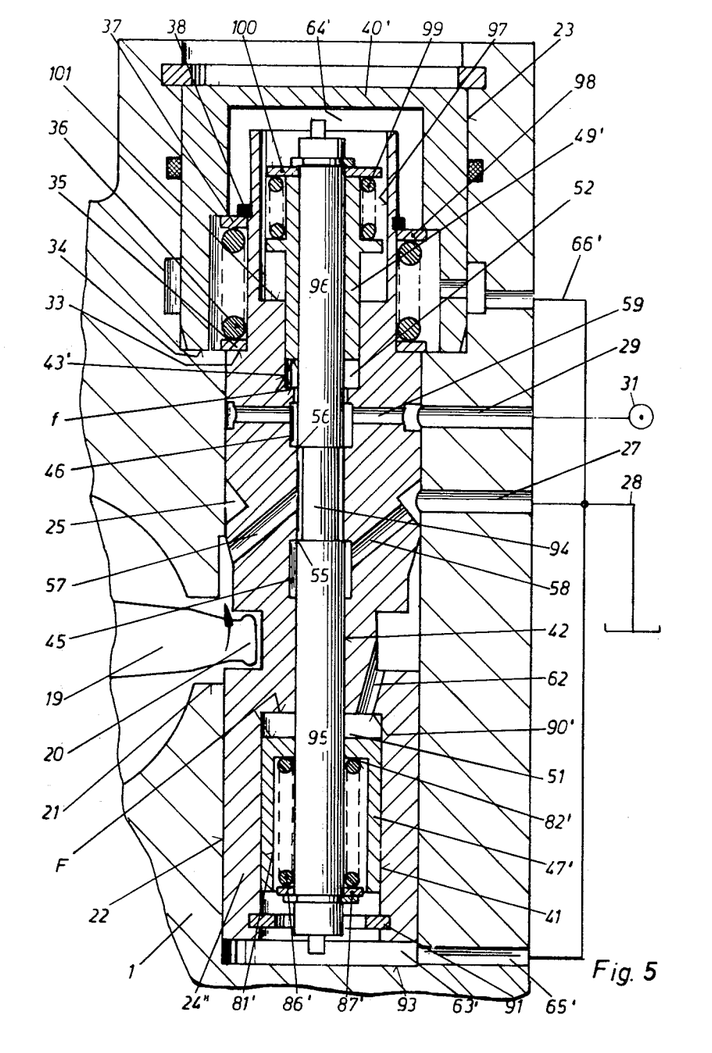
FIG. 5 is a cross-sectional view of the valve members of a further embodiment providing limited steering effort.

FIG. 5 is another embodiment of valve members providing limitation of steering effort, shown on a larger scale. The body 1 as well as the annular grooves, ducts and bores in the body 1 agree with those described with reference to FIG. 2. The control sleeve 24'' is also identical in several respects with that in FIG. 2. The control piston comprises two portions 95 and 96 separated by a neck 94 and contained in bore 42 of the control sleeve 24''. The control edges 55 and 56 adjoining the neck 94 cooperate with corresponding edges of the two annular grooves 45 and 46. Slidable on portion 95 in fluid-tight manner in the bore 41 is a piston portion 47'. This portion 47' contains an internal bore 81' extending along part of its length and exceeding the diameter of portion 95. This bore contains a spring 86' which at one end is supported by the end 82' of the bore 81', whereas the other end bears against a retainer 87' supported by portion 95 of the piston. The chamber 63' which faces the axial end of the portion 95 communicates through a connection 65' with exhaust through a return pipe 28. The annular chamber 51 which is formed between portion 95, the control sleeve 24'' and portion 47', and which serves as a reaction chamber, communicates with slot 21 through a duct 62. A further piston portion 49' slides on portion 96 and part of its length slides in fluid-tight contact with the walls of a bore 43' in the control sleeve 24' and thus divides off an annular chamber 52 which is in permanent communication with the annular groove 46. The remaining length of piston portion 49' extends with radical clearance into a bore 97 adjoining the bore 33'. In this region the external periphery of portion 49' is provided with an abutment for supporting a spring 99 which at its other end bears against a stop member 100 on portion 96. The shoulder formed at the junction of the two bores 43' and 97 is marked 101. The shoulder formed at the junction of the two bores 43' and 42 provides a hydraulic reaction surface $f$. The hydraulic cross section of the annular chamber 51 is F. The annular chamber 64' which faces the end of portion 96 is connected by a pipe 66' to the exhaust pipe 28.

For an explanation of how this arrangement functions it may be assumed that the areas of the two surfaces $f : F$ are in the proportion of 1 : 2 and equal to that of the effective hydraulic cross sections of the servo motor. Provided the pressure source 31 supplies pressure the full pump pressure will build up in the reaction chamber 52 when the control sleeve 24'' is in position of rest, whereas the pressure in the reaction chamber 51 will be only half as great. The products of the pressures and their associated areas operate to keep the control sleeve 24'' in equilibrium. The spring 99 should be so calculated that the pump pressure can push portion 49' as far as the stop 100 so that initially the spring 99 will have no effect. Now the spring 86 is so calculated that portion 47' is midway between the stops 90' and 91. If the steering finger 19 is deflected downwards, the pressure in reaction chamber 51 will rise, as already previously described and portion 47' will be displaced out of its center position. This displacement will continue until contact is made with stop 91. The reaction thrust at this instant will correspond to the displacement of portion 47' out of its center position to stop 91 times the spring rate of spring 86'. Further pressure increases in the reaction chamber 51 will not then bring about a further increase in reactive thrust. If conversely deflection of finger 19 upwards causes the pressure in reaction chamber 51 to fall then portion 47' will likewise move upwards, i.e., towards stop face 90'. The reaction at this instant will again be equal to the decrease in spring thrust, i.e., to the displacement of portion 47' out of its center position into contact with stop face 90' times the spring rate. Assuming that originally portion 47' was in center position, the same maximum possible reactions will result in either direction. Even if the pressure in reaction chamber 51 were to drop to zero, the spring thrust would still act on the control sleeve 24''. For an explanation of the function of spring 99 let it be assumed that the vehicle were stationary and that the pressure everywhere in the system were zero. In such a case spring 86' will expand until the sleeve 47' bears against the stop face 90'. In the absence of other external forces the control piston would thus shift out of its center position in relation to the sleeve 24'' and the starting up of the pressure source could lead to the undesirable phenomenon of the steering wheel and the wheels performing uncontrolled movements until the system was again hydraulically balanced. This is prevented because in a state of zero pressure spring 99 will likewise fully expand and push the stop face 98 against the stop face 101. The spring thrust of spring 99 which is now effective is so calculated in relation to the thrust of spring 86' that the control piston will be centered in relation to the control sleeve 24″. This action permits the pressure source 31 to be started up without causing trouble.

Naturally the invention is not limited in scope to the illustrated embodiments. More particularly, it would be possible to apply the principle that underlies the invention to so-called four-edge control systems. In such a case the control sleeve would be provided with blind holes in its end face for the reception therein of two independently slidable valve pistons supported by springs from the main body of the gear. Each piston might then be provided with two control edges, and preferably contain no steps, the ends facing away from the springs being loaded by the pressures existing in the associated working chambers. The servo piston for such a piston valve would then appropriately have two faces of substantially the same hydraulic cross section.

What is claimed is:

1. In a constant pressure blocked-center servo system for motor vehicles, including an input member connected to a steering wheel and an output member connected to steered wheels of a vehicle, a working fluid operated servo motor having first and second working chambers connected to said output member, control means in fluid communication with said motor for controlling the pressure of said work fluid to said servo motor including a housing substantially surrounding said control means, a source of pressurized working fluid in fluid communication with a first opening in said housing for supplying pressurized working fluid to said control means, an exhaust fluid conduit means in fluid communication with a second opening in said housing for receiving an exhaust fluid from said control means, and fluid conduit means connecting said first working chamber of said motor in fluid communication with a third opening in said housing for transmitting working fluid to and receiving exhaust fluid from said first working chamber of said motor, said third opening normally not in fluid communication with said first and second openings, the improvement comprising fluid flow switching means for completing one of two possible separate fluid conducting connections, said connections including:

a first fluid conducting connection between said first and third openings in said housing, whereby said first working chamber of said motor is connected in fluid communication with said source of pressurized working fluid by way of said fluid conduit means, and a second fluid conducting connection between said second and third openings in said housing, whereby said first working chamber of said servo motor is connected in fluid communication with said exhaust fluid conduit means through said fluid conduit means, said fluid switching means including:

first valve means including an elongated sleeve means substantially surrounded by said housing of said control means and being slidably displaceable within said housing along the longitudinal axis of said sleeve means between first and second limit positions defined by said housing, said first valve sleeve means comprising first and second ends adjacent said first and second limit positions, respectively, and first, second, and third fluid conducting cavities in constant fluid communication with said first, second, and third openings in said housing, respectively; and second valve means substantially enclosed within said first valve means, including an elongated valve shaft slidably displaceable within a first bore extending along the longitudinal axis of said first valve sleeve means, said elongated valve shaft including:

first and second shaft sections fluid sealingly engaging the surface of said first bore, and a third shaft section disposed between and of smaller diameter than said first and second shaft sections, said first shaft section with said first and second shaft sections and said surface of said first bore defining an annular, fluid conducting passageway being in fluid communication with said third fluid conducting cavity and longitudinally shiftable into fluid communication with said first and second fluid conducting cavities, said second valve means also including: fluid pressure change responsive means for longitudinally shifting said elongated valve shaft means and said passageway into communication with one of said first and second fluid conducting cavities, said fluid pressure responsive means including a fluid pressure reaction chamber in fluid communication with said first working chamber of said servo motor and piston means connected to a first end portion of said valve shaft, said piston means longitudinally shiftable between limit positions in said reaction chamber, whereby fluid pressure changes inside said reaction chamber acting on said piston means serve to longitudinally shift said valve shaft and to place said passageway into fluid communication with one of said first and second fluid conducting cavities, said control means further including actuating means responsive to said input member for causing fluid pressure changes in said reaction chamber, whereby turning of said steering wheel acts upon said input member causing said actuating means to longitudinally displace said first valve sleeve means and to move said first or second fluid conducting cavity into fluid communication with said passageweay thereby causing an increase or decrease in fluid pressure in said reaction chamber, said increase or decrease acting on said piston means causing said valve shaft to shift longitudinally to increase or decrease fluid pressure in said first working chamber and thereby to supply motive power to said output member.

2. A servo steering system according to claim 1, wherein said control means further includes biasing means disposed in said housing for establishing a response threshold for said control means which said actuating means must overcome before said elongated valve shaft will longitudinally shift and biasing said first valve means into a generally longitudinally centered position relative to said first and second limit positions.

3. A servo steering system according to claim 2, wherein said control means includes a control piston defining a portion of said first working chamber.

4. A servo steering system according to claim 2 wherein said first bore of said second valve means includes an enlarged end portion defining a second reaction chamber remote from said first reaction chamber, the diameter of said second reaction chamber being greater than the diameter of said second shaft section and smaller than the diameter of said first valve sleeve means, an annular sleeve slidable in said second reaction chamber between first and second limit positions surrounding said second shaft section and in sliding contact with said first bore wall, said second reaction chamber extending longitudinally between the end of said enlarged portion of said first bore closest to said first reaction chamber and the immediately adjacent end of said annular sleeve, and biasing means in said second reaction chamber normally urging said adjacent end of said annular sleeve into contact with said closest end of said enlarged first bore portion, said second reaction chamber being in constant fluid communication with said source of pressurized fluid.

5. A servo steering system according to claim 4 wherein the ratio of the cross section of said first working chamber of said servo motor to the hydraulic cross section of the second working chamber of said servo motor is the same as the ratio of the effective working area of the annular sleeve end in said second fluid pressure reaction chamber to the effective working area of said piston means in said first fluid pressure reaction chamber.

6. A servo steering system according to claim 1 further including a spring for biasing said piston means in a direction for reducing the fluid capacity of said first reaction chamber, said spring having one end sealed against said first limit position of said first valve sleeve means and its other end sealed against said piston means and causing said piston means to be substantially centered between said limit positions of said piston means when said source is furnishing pressurized working fluid to said first working chamber.

7. A servo steering system according to claim 1, wherein said piston means comprises a piston sleeve concentrically disposed around said first shaft section and engaging said shaft section in a fluid-sealing manner at one end of said sleeve, spring means within said piston sleeve, said spring means abutting said piston sleeve end in fluid-sealing engagement with said shaft, spring stop means fixedly mounted on said first shaft section adjacent its end remote from said second shaft section, said spring stop means disposed within said piston sleeve, said stop means supporting the other end of said spring means, said spring means biasing said piston means in a direction to reduce the fluid capacity of said first reaction chamber.

* * * * *